US009075155B2

(12) United States Patent
Luscombe et al.

(10) Patent No.: US 9,075,155 B2
(45) Date of Patent: Jul. 7, 2015

(54) OPTICAL FIBER BASED DOWNHOLE SEISMIC SENSOR SYSTEMS AND METHODS

(75) Inventors: John Luscombe, Oxford (GB); Etienne M. Samson, Houston, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 506 days.

(21) Appl. No.: 13/082,522

(22) Filed: Apr. 8, 2011

(65) Prior Publication Data

US 2012/0257475 A1   Oct. 11, 2012

(51) Int. Cl.
*G01V 1/48* (2006.01)
*G01V 8/16* (2006.01)
*G01V 1/22* (2006.01)
*G01V 1/28* (2006.01)
*G01V 1/42* (2006.01)
*G01V 8/24* (2006.01)

(52) U.S. Cl.
CPC . *G01V 1/226* (2013.01); *G01V 1/42* (2013.01); *G01V 8/24* (2013.01); *G01V 1/48* (2013.01); *G01V 1/288* (2013.01); *G01V 2210/1234* (2013.01)

(58) Field of Classification Search
CPC ......... G01V 1/48; G01V 1/226; G01V 1/288; G01V 2210/1234; G01V 8/24; G01V 1/42
USPC .................. 33/302; 73/152.48; 181/104, 112; 250/254; 324/338, 341; 367/38, 58, 59, 367/73, 178, 25; 385/13
See application file for complete search history.

(56) References Cited

U.S. PATENT DOCUMENTS

| 3,019,841 | A | 2/1962 | Ternow et al. |
| 4,407,365 | A | 10/1983 | Cooke, Jr. |

(Continued)

FOREIGN PATENT DOCUMENTS

| GB | 2401178 A | 3/2004 |
| WO | WO-01/81914 | 11/2001 |

(Continued)

OTHER PUBLICATIONS

Optical time-domain reflectometer, Wikipedia, pp. 1-7, downloaded Jun. 22, 2013 from http://en.wikipedia.org/wiki/Optical_time-domain_reflectometer.*

(Continued)

*Primary Examiner* — Daniel L Murphy
(74) *Attorney, Agent, or Firm* — Krueger Iselin LLP

(57) ABSTRACT

Various optical fiber-based seismic monitoring system embodiments include a light source that drives an optical fiber positioned within a borehole. At least one light sensor analyzes Rayleigh backscattered light to obtain an acoustic signal for each of multiple points along the borehole. One or more processors operate to determine microseismic event direction, distance, and/or intensity based at least in part on phase information of said acoustic signals. The acoustic signal cross-correlations, semblances, or phase-sensitive similarity measures can be determined as a function of scanning direction to accurately determine the relevant microseismic event information. The optical fiber may be positioned in the cemented annulus of a cased borehole having a shape that extends along more than one dimension (e.g., an L-shaped borehole).

16 Claims, 4 Drawing Sheets

(56) References Cited

U.S. PATENT DOCUMENTS

| | | | |
|---|---|---|---|
| 4,760,563 A * | 7/1988 | Beylkin | 367/73 |
| 4,785,247 A | 11/1988 | Meador et al. | |
| 4,794,336 A | 12/1988 | Marlow et al. | |
| 4,896,303 A | 1/1990 | Leslie et al. | |
| 4,986,121 A | 1/1991 | Luscombe | |
| 5,037,172 A | 8/1991 | Hekman et al. | |
| 5,214,614 A * | 5/1993 | Baule | 367/58 |
| 5,429,190 A | 7/1995 | Kilgore et al. | |
| 5,626,192 A | 5/1997 | Connell et al. | |
| 5,712,828 A | 1/1998 | Luscombe et al. | |
| 5,892,860 A | 4/1999 | Maron et al. | |
| 5,943,293 A | 8/1999 | Luscombe et al. | |
| 6,053,245 A | 4/2000 | Haberman | |
| 6,128,251 A | 10/2000 | Erath et al. | |
| 6,160,762 A | 12/2000 | Luscombe et al. | |
| 6,188,645 B1 | 2/2001 | Maida et al. | |
| 6,188,646 B1 | 2/2001 | Luscombe et al. | |
| 6,195,162 B1 | 2/2001 | Varnham et al. | |
| 6,211,964 B1 | 4/2001 | Luscombe et al. | |
| 6,233,746 B1 | 5/2001 | Skinner | |
| 6,256,588 B1 | 7/2001 | Maida et al. | |
| 6,268,911 B1 | 7/2001 | Tubel et al. | |
| 6,307,809 B1 | 10/2001 | Luscombe et al. | |
| 6,408,943 B1 | 6/2002 | Schultz et al. | |
| 6,422,084 B1 | 7/2002 | Fernald et al. | |
| 6,522,797 B1 | 2/2003 | Siems et al. | |
| 6,591,025 B1 | 7/2003 | Siems et al. | |
| 6,731,389 B2 | 5/2004 | Luscombe et al. | |
| 6,789,621 B2 | 9/2004 | Wetzel et al. | |
| 6,834,233 B2 | 12/2004 | Economides et al. | |
| 6,847,034 B2 | 1/2005 | Shah et al. | |
| 6,853,604 B2 | 2/2005 | Spackman et al. | |
| 6,907,170 B1 | 6/2005 | Maida | |
| 6,913,083 B2 | 7/2005 | Smith | |
| 6,931,188 B2 | 8/2005 | Kersey et al. | |
| 6,957,574 B2 | 10/2005 | Ogle | |
| 7,006,918 B2 | 2/2006 | Economides et al. | |
| 7,095,012 B2 | 8/2006 | Fujisawa et al. | |
| 7,104,324 B2 | 9/2006 | Wetzel et al. | |
| 7,159,468 B2 | 1/2007 | Skinner et al. | |
| 7,163,055 B2 | 1/2007 | Coon et al. | |
| 7,182,134 B2 | 2/2007 | Wetzel et al. | |
| 7,216,710 B2 | 5/2007 | Welton et al. | |
| 7,219,729 B2 | 5/2007 | Bostick, III et al. | |
| 7,219,730 B2 | 5/2007 | Tilton et al. | |
| 7,245,791 B2 | 7/2007 | Rambow et al. | |
| 7,408,645 B2 | 8/2008 | DiFoggio | |
| 7,409,858 B2 | 8/2008 | Dria et al. | |
| 7,458,273 B2 | 12/2008 | Skinner et al. | |
| 7,461,547 B2 | 12/2008 | Terabayashi et al. | |
| 7,511,823 B2 | 3/2009 | Schultz et al. | |
| 7,529,434 B2 | 5/2009 | Taverner et al. | |
| 7,641,395 B2 | 1/2010 | Ringgenberg et al. | |
| 7,665,543 B2 | 2/2010 | Bostick, III et al. | |
| 7,669,440 B2 | 3/2010 | Kersey et al. | |
| 7,864,321 B2 | 1/2011 | Caron et al. | |
| 7,938,178 B2 | 5/2011 | Ringgenberg et al. | |
| 8,636,063 B2 | 1/2014 | Ravi et al. | |
| 2003/0205375 A1 | 11/2003 | Wright et al. | |
| 2003/0210403 A1 | 11/2003 | Luscombe et al. | |
| 2005/0072678 A1 | 4/2005 | Hunter et al. | |
| 2005/0169794 A1 | 8/2005 | Welton et al. | |
| 2005/0180262 A1 | 8/2005 | Robinson | |
| 2005/0207279 A1 | 9/2005 | Chemali et al. | |
| 2006/0010973 A1 | 1/2006 | Brown | |
| 2006/0081412 A1 | 4/2006 | Wright et al. | |
| 2007/0010404 A1 | 1/2007 | Welton et al. | |
| 2007/0187648 A1 | 8/2007 | Welton et al. | |
| 2007/0193351 A1 | 8/2007 | DiFoggio | |
| 2008/0227668 A1 | 9/2008 | Welton et al. | |
| 2008/0227669 A1 | 9/2008 | Welton | |
| 2008/0280789 A1 | 11/2008 | Welton et al. | |
| 2008/0314139 A1 | 12/2008 | DiFoggio | |
| 2009/0120640 A1 | 5/2009 | Kulakofsky et al. | |
| 2009/0143258 A1 | 6/2009 | Welton et al. | |
| 2009/0271115 A1 | 10/2009 | Davis et al. | |
| 2010/0200743 A1 | 8/2010 | Forster et al. | |
| 2010/0200744 A1 | 8/2010 | Pearce et al. | |
| 2011/0090496 A1 | 4/2011 | Samson et al. | |
| 2011/0100629 A1 | 5/2011 | Welton et al. | |
| 2011/0105386 A1 | 5/2011 | Welton et al. | |
| 2011/0109912 A1 | 5/2011 | Spross et al. | |
| 2011/0116099 A1 | 5/2011 | Spross et al. | |
| 2012/0118567 A1 | 5/2012 | Cooke, Jr. | |
| 2012/0132417 A1 | 5/2012 | Dria et al. | |
| 2013/0245947 A1 | 9/2013 | Samsom et al. | |

FOREIGN PATENT DOCUMENTS

| | | |
|---|---|---|
| WO | WO-2006/063094 | 6/2006 |
| WO | WO-2008/081467 | 7/2008 |
| WO | WO-2009/007822 | 1/2009 |
| WO | WO-2010/090660 A1 | 8/2010 |
| WO | WO-2011/017413 | 2/2011 |
| WO | WO-2011/0193401 | 2/2011 |
| WO | WO-2012/136951 | 10/2012 |
| WO | WO-2012/136951 A3 | 10/2012 |
| WO | WO-2013/137992 | 9/2013 |

OTHER PUBLICATIONS

Graber, Karen K., et al., "Drill String Tool Sheet", Overview of Ocean Drilling Program, http://www.odp.tamu.edu/publications/tnotes/tn31/drill_s/drill_s.htm> (retrieved Sep. 21, 2009), (Jul. 2004), pp. 1-3.

Levine, Dennis C. et al., "Annular Gas Flow After Cementing: A Look at Practical Solutions", 54th Ann. Fall Tech. Conf. and Exhib. of the SPE, Paper No. 8255, (Sep. 23, 1979),11 pgs.

Li, Weizhuo et al., "Wavelength Multiplexing of Microelectromechanical System Pressure and Temperature Sensors Using Fiber Bragg Gratings and Arrayed Waveguide Gratings", Opt. Eng. Society of Photo-Optical Instrumentation Engineers, 0091-3286/2003, (Feb. 2003), pp. 431-438.

MacDougall, Trevor W., et al., "Large Diameter Waveguide Bragg Grating Components and Their Application in Downhole Oil & Gas Sensing", Weatherford International, Wallingford, CT, (Unkn), 12 pgs.

Ravi, Kris et al., "Cement Slurry Monitoring", U.S. Appl. No. 13/028,542, filed Feb. 16, 2011, (Aug. 16, 2012), 19 pgs.

"US Non-Final Office Action", dated Jan. 29, 2013, U.S. Appl. No. 13/028,542, "Cement Slurry Monitoring", filed Feb. 16, 2011, 10 pgs.

"PCT International Search Report and Written Opinion", dated Jun. 20, 2012, Appl No. PCT/GB2012/000154, "Cement Slurry Monitoring", filed Feb. 15, 2012, 13 pgs.

Samson, Etienne et al., "A Near-Field Electromagnetic Communications Network for Downhole Telemetry", PCT Appl No. PCT/US09/53492, filed Aug. 11, 2009, 15 pgs.

Shell, Baker Hughes, "Pioneer Real-time Compaction Imaging System", Oil&Gas Eurasia, http://www.oilandgaseurasia.com/news/p/2/news/5146, Jun. 29, 2009, 2 pgs.

Halliburton Energy Services, Inc, "StimWatch Stimulation Monitoring Service—FiberWatch Fiber Optic Distributed Temperature Sensing Technology", Pinnacle, a Halliburton Services, http://www.halliburton.com/public/pe/contents/Data_Sheets/web/H/H04481.pdf, 2010, 4 pgs.

Kris, R., et al., "Cement Slurry Monitoring", U.S. Appl No. 13/028,542, filed Feb. 15, 2011 19 pgs.

"PCT Written Opinion of the International Preliminary Examining Authority", dated Jul. 15, 2013, Appl No. PCT/GB2012/000298, "Optical Fiber Based Downhole Seismic Sensor Systems and Methods", filed May 30, 2012, 5 pgs.

"US Final Office Action", dated May 13, 20133, U.S. Appl. No. 13/028,542, "Cement Slurry Monitoring", filed Feb. 16, 2011, 9 pgs.

(56) References Cited

OTHER PUBLICATIONS

"AU Patent Examination Report No. 1", dated May 22, 2014, Appl. No. 2012238471, "Optical Fiber Based Downhole Seismic Sensor Systems and Methods," filed Apr. 8, 2011, 3 pgs.

"International Preliminary Report on Patentability", dated Jun. 23, 2014, Appl No. PCT/US2013/024845, "Downhole system and methods for water source determination," filed Feb. 6, 2013, 9 pgs.

"MX First Office Action", dated Aug. 19, 2014, Appl. No. MX/a/2013/011661, "Optical Fiber-Based Downhole Seismic Sensor System Based on Rayleigh Backscatter," filed Oct. 7, 2013, 6 pgs.

"RU Notification of Examination of Invention Patentability", dated Sep. 4, 2014, Appl. No. 2013149857/28(077505), "Optical Fiber Based Downhole Seismic Sensor Systems and Methods," filed Mar. 30, 2012, 4 pgs.

"Search report and written opinion", dated Jan. 16, 2014, Appl No. PCT/US2013/024845, "Downhole system and methods for water source determination," filed Feb. 6, 2013, 12 pgs.

Medhat, Abdou et al., "Finding value in formation water", Oilfield Review, vol. 23, No. 1, Mar. 1, 2011, XP055095547, ISSN: 0923-1730, 12 pgs.

* cited by examiner

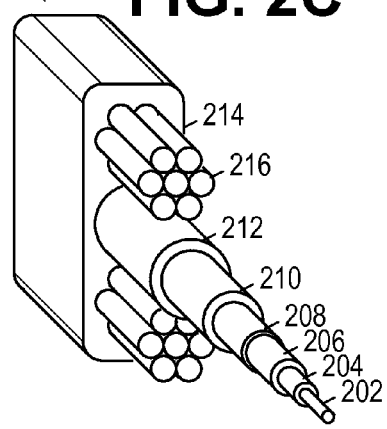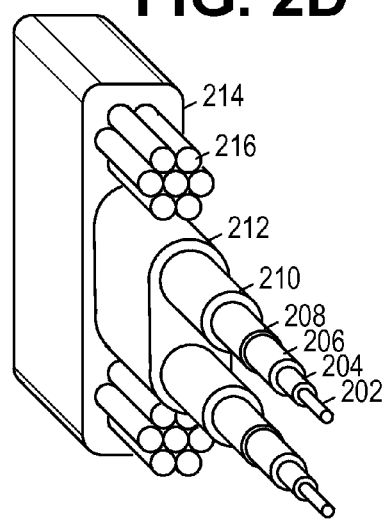

FIG. 5
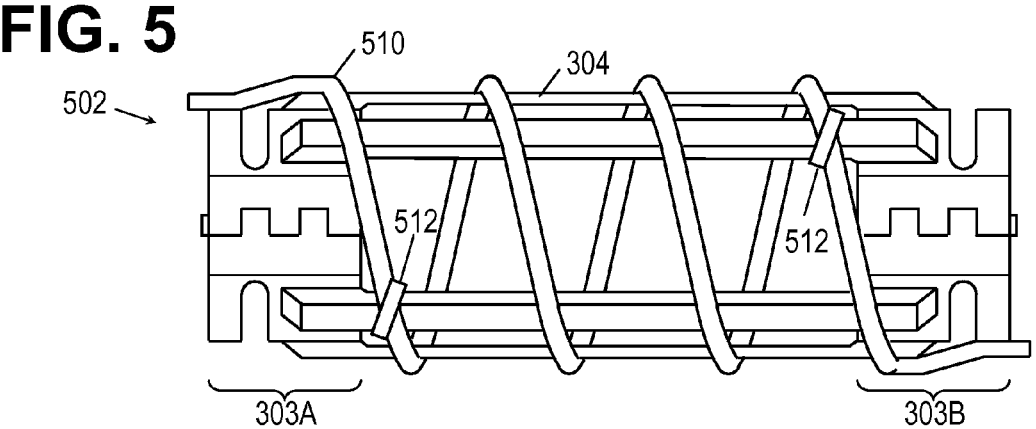
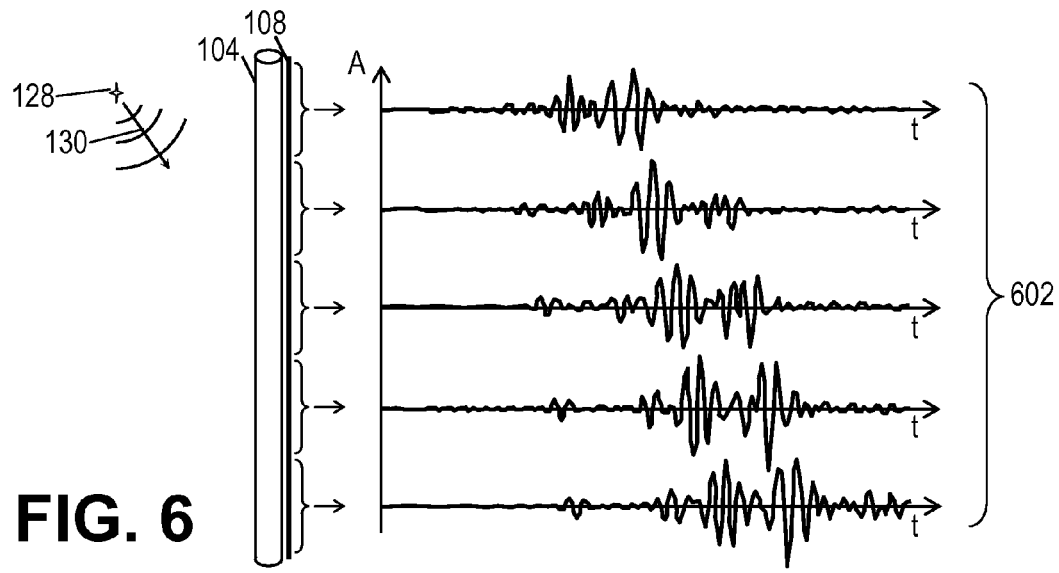
FIG. 6
FIG. 7
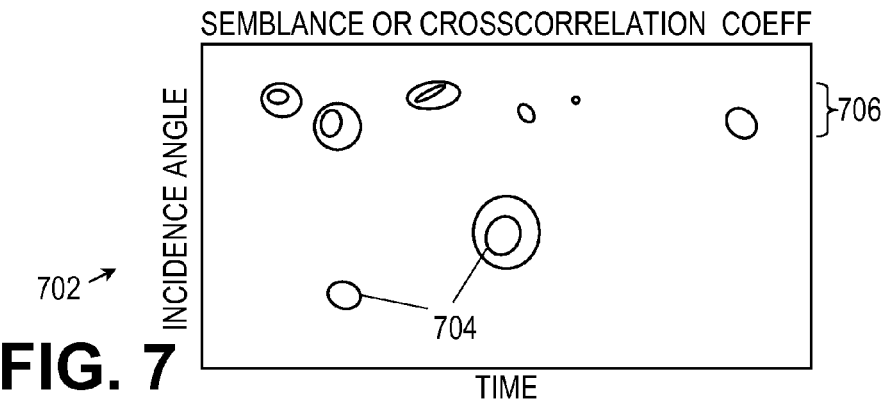

OPTICAL FIBER BASED DOWNHOLE SEISMIC SENSOR SYSTEMS AND METHODS

BACKGROUND

Oilfield drilling, stimulation, and production activities often cause microearthquakes (microseismic events), either by compacting rock, propagating fractures, or relieving shear stress. Such events may result from reservoir stimulation, hydraulic fluid injection, and reservoir depletion, just to name a few examples. Microseismic events cause pressure and/or shear waves to propagate outward in all directions from the event. Receivers up to a kilometer away have been used to detect and locate such events in rock types ranging from unconsolidated sands, to chalks, to crystalline rocks. It is expected that the frequency, intensity, and spatial distribution of microseismic events will reveal valuable information about the chemical, hydraulic, and/or mechanical processes occurring in the volume around boreholes in the earth. For example, microseismic monitoring is often used to map new fractures as they are created by hydraulic fracturing or water flooding techniques.

Microseismic monitoring is usually performed from one or more monitoring wells each having an array of wireline receivers. With the receivers deployed in several wells, the microseismic event locations can be triangulated as is done in earthquake detection, i.e., by determining the arrival times of the various p- and s-waves, and using formation velocities to find the best-fit location of the microseismic events. However, multiple monitoring wells are not usually available. With only a single monitoring well, multiple wireline directional receiver arrays may be used to locate the microseismic events. Once the microseisms are located, the actual fracture is usually interpreted within the envelope of microseisms mapped, but very accurate detection and location is usually necessary to determine the precise length, direction, and height of the created fractures. Existing systems and methods may be unable to provide sufficient accuracy without substantial cost and/or computational complexity.

BRIEF DESCRIPTION OF THE DRAWINGS

A better understanding of the various disclosed system and method embodiments can be obtained when the following detailed description is considered in conjunction with the drawings, in which:

FIGS. 2A-2D show illustrative sensing fiber constructions.

FIGS. 3A-3B show an illustrative mounting assembly.

FIG. 4 shows an illustrative angular distribution of sensing fibers.

FIG. 5 shows a illustrative helical arrangement for a sensing fiber.

FIG. 6 shows an illustrative mapping of seismic signals to distributed sensing positions.

FIG. 7 shows an illustrative array-processing data image;

NOMENCLATURE

The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. The term "fluid" as used herein includes materials having a liquid or gaseous state.

DETAILED DESCRIPTION

The issues identified in the background are at least partly addressed by the various optical fiber-based seismic monitoring systems and methods disclosed herein. At least some system embodiments include a light source that drives an optical fiber positioned within a borehole. At least one light sensor analyzes Rayleigh backscattered light to obtain an acoustic signal for each of multiple points along the borehole. One or more processors operate to determine microseismic event direction, distance, and/or intensity based at least in part on phase information of said acoustic signals. The acoustic signal cross-correlations, semblances, or phase-sensitive similarity measures can be determined as a function of scanning direction to accurately determine the relevant microseismic event information. The optical fiber may be positioned in the cemented annulus of a cased borehole having a shape that extends along more than one dimension (e.g., an L-shaped borehole). At least some method embodiments include: transmitting modulated light into an optical fiber positioned within a borehole; analyzing Rayleigh backscattered light to obtain acoustic signals for each of multiple points along the borehole; determining direction, distance, and/or intensity of microseismic events based at least in part on phase information of the acoustic signals; and representing microseismic event information on a user interface.

Figure 1:
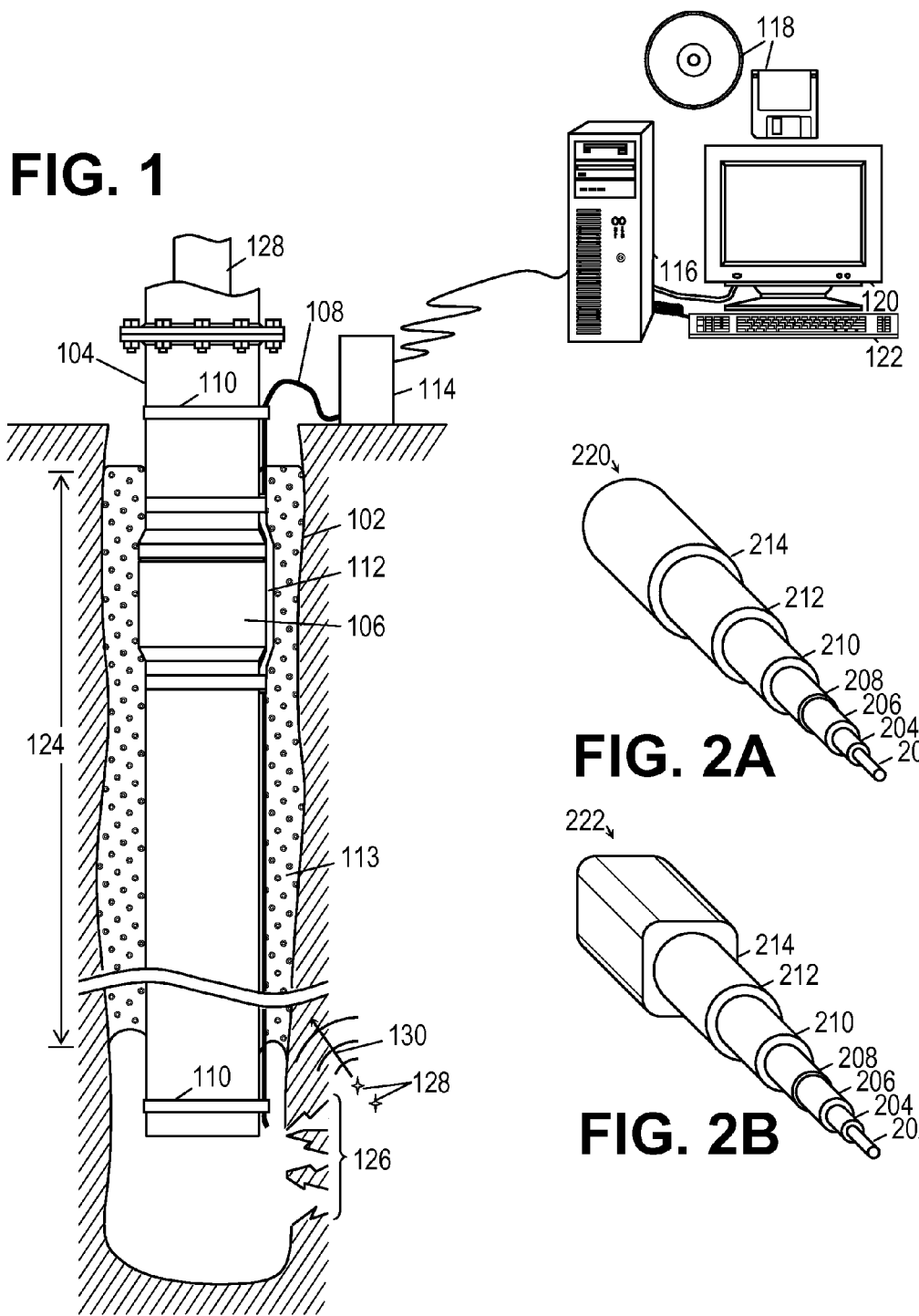
FIG. 1 shows an illustrative well with optical fiber based seismic monitoring system.
Figure 2A:
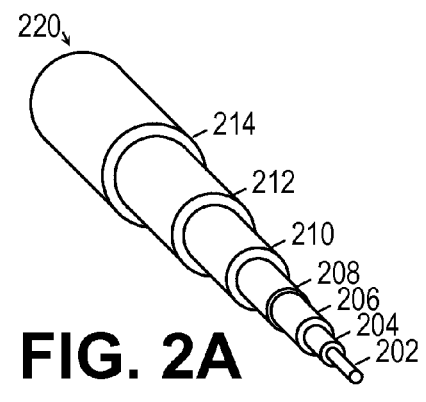
Figure 2B:
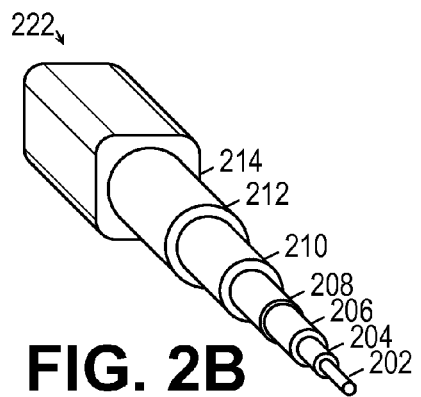

The disclosed systems and methods are best understood in terms of the context in which they are employed. Accordingly, FIG. 1 shows an illustrative borehole 102 that has been drilled into the earth. Such boreholes are routinely drilled to ten thousand feet or more in depth and can be steered horizontally for perhaps twice that distance. During the drilling process, the driller circulates a drilling fluid to clean cuttings from the bit and carry them out of the borehole. In addition, the drilling fluid is normally formulated to have a desired density and weight to approximately balance the pressure of native fluids in the formation. Thus the drilling fluid itself can at least temporarily stabilize the borehole and prevent blowouts.

To provide a more permanent solution, the driller inserts a casing string 104 into the borehole. The casing string 104 is normally formed from lengths of tubing joined by threaded tubing joints 106. The driller connects the tubing lengths together as the casing string is lowered into the borehole. During this process, the drilling crew can also attach a fiber optic cable 108 and/or an array of sensors to the exterior of the casing with straps 110 or other mounting mechanisms such as those discussed further below. Because the tubing joints 106 have raised profiles, cable protectors 112 may be employed to guide the cable over the joints and protect the cable from getting pinched between the joint and the borehole wall. The drillers can pause the lowering of the casing at intervals to unreel more cable and attach it to the casing with straps and protectors. In many cases it may be desirable to provide small diameter tubing to encase and protect the optical fiber cable. The cable can be provided on the reel with flexible (but crush-resistant) small diameter tubing as armor, or can be seated within inflexible support tubing (e.g., via a slot) before being attached to the casing. Multiple fiber optic cables can be deployed within the small diameter tubing for sensing different parameters and/or for redundancy.

Once the casing string 104 has been placed in the desired position the drilling crew injects a cement slurry 113 that flows into the annulus around the casing and sets to seal the casing to the formation. The cement 113 also provides acoustic coupling between the fiber optic cable(s) 108 and the formation. The cable(s) are trimmed and attached to a measurement unit 114. The measurement unit 114 supplies laser light pulses to the cable(s) and analyzes the returned signal(s) to perform distributed sensing of one or more parameters along the length of the casing. Contemplated measurement parameters include pressure, strain, deformation, or other indicators of seismic wave energy. Fiber optic cables that are specially configured to sense these parameters and which are suitable for use in harsh environments are commercially available. The light pulses from the measurement unit pass through the fiber and encounter one or more parameter-dependent phenomena. Such phenomena include Rayleigh backscattering of coherent light. Typical silica-based optical fibers are sensitive to density changes which, for appropriately configured fibers, are indicative of strain or other parameters that vary in response to seismic wave energy. Such variations will modulate elastic optical collisions within the fiber, giving detectable variations in the reflected light.

To collect seismic signal measurements, the measurement unit 114 may feed tens of thousands of laser pulses each second into the optical fiber and apply time gating to the reflected signals to collect parameter measurements at different points along the length of the cable. The measurement unit can process each measurement and combine it with other measurements for that point to obtain a high-resolution measurement of that parameter. A general purpose data processing system 116 can periodically retrieve the measurements as a function of position and establish a time record of those measurements. Software (represented by information storage media 118) runs on the general purpose data processing system to collect the measurement data and organize it in a file or database.

The software further responds to user input via a keyboard or other input mechanism 122 to display the measurement data as an image or movie on a monitor or other output mechanism 120. As explained further below, certain patterns in the measurement data are indicative of microseismic events. To some extent, the degree of microseismic activity can be visually identified by user inspection. Alternatively, or in addition, the software can process the data to identify individual microseisms and determine their direction, distance, and/or intensity as described further below. Such information is useful for tracking the progress of hydraulic fracture jobs, in which this borehole 102 or another nearby borehole has perforations 126 through which a fluid is pumped into the formation to widen and extend existing fractures and create new fractures. As such fractures open and move, they cause microseismic events 128 that cause elastic waves 130 to propagate through the formation. As such waves propagate, they encounter the borehole and the fiber optic cable in a manner that enables determination of the direction and distance to their source.

FIGS. 2A-2D show a number of illustrative fiber optic cable constructions suitable for use in the contemplated system. Downhole fiber optic cables are preferably designed to protect small optical fibers from corrosive wellbore fluids and elevated pressures while allowing for direct mechanical coupling (for pressure or strain measurements of seismic signals). These cables may be populated with multimode and/or single mode fiber varieties, although alternative embodiments can employ more exotic optical fiber waveguides (such as those from the "holey fiber" regime) for more enhanced supercontinuum and/or optically amplified backscatter measurements.

Each of the illustrated cables has one or more optical fiber cores 202 within cladding layers 204 having a higher refraction index to contain light within the core. A buffer layer 206, barrier layer 208, armor layer 210, inner jacket layer 212, and an outer jacket 214 may surround the core and cladding to provide strength and protection against damage from various dangers including moisture, hydrogen (or other chemical) invasion, and the physical abuse that may be expected to occur in a downhole environment. Illustrative cable 220 has a circular profile that provides the smallest cross section of the illustrated examples. Illustrative cable 222 has a square profile that may provide better mechanical contact and coupling with the outer surface of casing 104. Illustrative cables 224 and 226 have stranded steel wires 216 to provide increased tensile strength. Cable 226 carries multiple fibers 202 which can be configured for different measurements, redundant measurements, or cooperative operation. (As an example of cooperative operation, one fiber can be configured as a "optical pump" fiber that optically excites the other fiber in preparation for measurements via that other fiber.) Inner jacket 212 can be designed to provide rigid mechanical coupling between the fibers or to be compliant to avoid transmitting any strain from one fiber to the other.

Fiber sensor cable 108 may be attached to the casing string 104 via straight linear, helical, or zig-zag strapping mechanisms. FIGS. 3A and 3B show an illustrative straight strapping mechanism 302 having an upper collar 303A and a lower collar 303B joined by six ribs 304. The collars each have two halves 306, 307 joined by a hinge and a pin 308. A guide tube 310 runs along one of the ribs to hold and protect the cable 108. To attach the strapping mechanism 302 to the casing string 104, the drilling crew opens the collars 303, closes them around the casing, and hammers the pins 308 into place. The cable 108 can then be threaded or slotted into the guide tube 310. The casing string 104 is then lowered a suitable distance and the process repeated.

Some embodiments of the straight strapping mechanism can contain multiple cables within the guide tube 310, and some embodiments include additional guide tubes along other ribs 304. FIG. 4 shows an illustrative arrangement of multiple cables 402-416 on the circumference of a casing string 108. Taking cable 402 to be located at an azimuthal angle of 0°, the remaining cables may be located at 45°, 60°, 90°, 120°, 135°, 180°, and 270°. Of course a greater or lesser number of cables can be provided to improve azimuthal direction detection.

To obtain more densely-spaced measurements of the seismic signals, the cable can be wound helically on the casing string rather than having it just run axially. FIG. 5 shows an alternative strapping mechanism that might be employed to provide such a helical winding. Strapping mechanism 502 includes two collars 303A, 303B joined by multiple ribs 304 that form a cage once the collars have been closed around the casing string 104. The cable 510 is wound helically around the outside of the cage and secured in place by screw clamps 512. The cage serves to embed the cable 510 into the cement slurry or other fluid surrounding the casing string. Where a greater degree of protection is desired, the cable can be wound helically around the casing string 104 underneath the cage mechanism.

Other mounting approaches can be employed to attach the cables to the casing string. For example, casing string manufacturers now offer molded centralizers or standoffs on their casing. These take can the form of broad fins of material that are directly (e.g., covalently) bonded to the surface of the casing. Available materials include carbon fiber epoxy resins. Slots can be cut or formed into these standoffs to receive and secure the fiber optic cable(s). In some applications, the casing string may be composed of a continuous composite tubing string with optical fibers embedded in the casing wall.

FIG. 6 illustrates seismic waves 130 propagating outwards from a microseismic event 128. As the waves 130 travel to the casing string 104 and interact with the fiber optic cable 108, they induce changes in the intensity of Rayleigh-backscatter reflections that the measurement unit 114 translates into seismic signals 602 that correspond to various positions along the casing string. The correspondence between sensed signals and position can be determined, for example, with a wireline calibration run, in which a sound source is conveyed along the casing string. The wireline length is monitored as the measurement unit determines the sensing position of the largest acoustic signal. An alternative calibration method employs the triggering of a seismic source on the surface and a model of the propagation velocities of the earth around the borehole.

Note that the seismic signals 602 for different positions exhibit a time shift in accordance with the propagation time from the event 128 to the corresponding position in the fiber. The nearer portions of the fiber detect the seismic wave sooner than the farther portions. Array processing is a technique that exploits the difference in time shifts that would be expected for different event locations. The seismic signals are digitized, stored, and communicated to a digital computer for processing by software that extracts the microseismic event information, such as direction, distance, and intensity.

One illustrative array processing method is that of calculating similarity between the various seismic signals as a function of one or more parameters relating to location of a microseismic event. Suitable similarity measures include cross-correlation (with cross-covariance as a special case) and semblance. The cross-correlation coefficient of two signals can be expressed:

$$c(\tau, m) = \sum_{t=mT}^{(m+1)T} s_1(t) s_2(t-\tau) \Big/ \sqrt{\sum_{t=mT}^{(m+1)T} s_1^2(t)} \sqrt{\sum_{t=mT}^{(m+1)T} s_2^2(t-\tau)} \quad (1)$$

where $s_1(t)$ and $s_2(t)$ are the signals across a sequence of time windows of width T, m is time window index, and $\tau$ is a speculative time shift between the two signals. The value of $\tau$ that maximizes the correlation coefficient is often called the time lag between the two signals, and it also corresponds to the time shift that minimizes the mean square error between the normalized signals. For more than two signals, a pair-wise cross-correlation may be determined for every pair of signals and the systematic variation of time lags may be analyzed to find the model parameters that provide the best fit. For example, a plane wave detected by evenly spaced (and sequentially numbered) sensing stations might be expected to yield signals having a systematic time lag variation of $n\Delta t$, where n is the difference between the station numbers.

The semblance coefficient for a set of N signals can be expressed:

$$e(\tau, m) = \sum_{t=mT}^{(m+1)T} \left[\sum_{n=1}^{N} s_n(t-n\tau)\right]^2 \Big/ N \sum_{n=1}^{N} \sum_{t=mT}^{(m+1)T} s_n^2(t-n\tau) \quad (2)$$

where $s_n(t)$ are the signals from N sequentially numbered sensing stations n across a sequence of time windows of width T, m is time window index, and $\tau$ is a time shift between signals from adjacent stations. The value of $\tau$ that maximizes the semblance coefficient (or alternatively, that maximizes the average cross-correlation coefficient) is indicative of a plane wave's incidence direction.

Where v is the propagation velocity of seismic waves through the formation around a borehole, d is the inter-station spacing, and $\theta$ is the incidence angle (i.e., the angle between the plane wave's normal and the borehole axis), the expected time lag between signals from adjacent stations would be:

$$\tau = \frac{d}{v}\cos\theta \quad (3)$$

thereby enabling a straightforward mapping of time lag to incidence angle. The presence or absence of a seismic event can be determined by comparing the semblance coefficient or average cross-correlation coefficient to a threshold. With the threshold adjusted to screen out random system noise, this detection method can be quite reliable.

Accordingly, the computer can analyze the acquired signals from a group of sensing stations to produce a plot such as that shown in FIG. 7. FIG. 7 shows a plot of semblance coefficient value (or average cross-correlation coefficient value) 702 as a function of incidence angle (vertical axis) and time window (horizontal axis). Colors or contour lines can be used to indicate coefficient values, making microseismic events readily apparent as peaks 704 in the plot. Such plots can also reveal patterns such as a series of events 706 at relatively consistent direction, perhaps indicating the propagation of a particular fracture.

Other plots can similarly be employed for microseismic event detection and analysis. For example, the individual signals in each time window may be Fourier transformed into the frequency domain. The signals' frequency spectra can then be subjected to a spatial Fourier transform. The combined transforms recast the received signal energy from the space-time domain into a wave number-frequency domain (sometimes referred to as the k-ω domain). The wave number k equals $\cos\theta/\lambda$, where $\theta$ is the incidence angle and $\lambda$ is the wavelength. Peaks in the k-ω domain are indicative of microseismic events.

Where multiple propagation paths are possible, advanced processing techniques can be used to isolate individual microseismic events. For example, a wave number cross covariance matrix can be calculated in a given frequency range of interest and subjected to an eigenvalue-eigenvector decomposition to segregate the contributions of different microseismic events. The wave number cross covariance matrix can be found by first averaging k-ω domain values from a number of adjacent time windows, then multiplying the rth average k-ω domain value in a given frequency bin by the cth average k-ω domain value in that frequency bin to determine the element of the matrix at row r, column c. The products of the eigenvectors with the vector of k-ω domain values for the given frequency range separate out the contributions of the different microseismic events.

Another illustrative processing method is a beam forming operation which can be expressed:

$$b(t) = \sum_{n=1}^{N} d_n s_n(t - \tau_n) \quad (4)$$

where $d_n$ and $\tau_n$ are weights and delays chosen to optimize the array's sensitivity to signals from a given direction. The processing system may scan through a range of directions using an array of predetermined weights and delays to find the direction which provides the strongest beam signal b(t) in any given time window.

Figure 8:
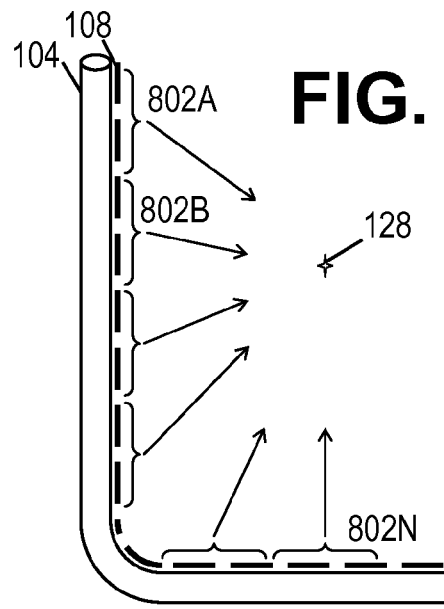
FIG. 8 shows an illustrative event triangulation method.

The fiber optic sensing system is expected to provide a 20 kHz (or higher) signal sampling rate with 1 meter spatial resolution along the length of the cable. As indicated in FIG. 8, this large array of sensing stations can be subdivided into sub-arrays 802A-802N, e.g., groups of eight or sixteen sensing stations. The foregoing processing techniques can be used on the signals from each sub-array to determine corresponding incidence angles which can then be used to triangulate the location of the microseismic event 128. The triangulation provides distance information that, when combined with signal amplitude or energy measurements, provides a measure of microseismic event intensity. The measured signal energy can normally be expected fall off as the inverse square of the distance between the sensing station and the microseismic event.

We note that for a strictly vertical optical fiber, there remains a degree of azimuthal ambiguity. If all that can be determined is incidence angle and distance (due to triangulation from different subarrays), the location of microseismic event 128 can be anywhere on a circle surrounding the borehole. This azmimuthal ambiguity can be eliminated and the microseismic event localized to a single location if the optical fiber is not limited to a one-dimensional line, but rather extends in a two-dimensional or three-dimensional path. Accordingly, FIG. 8 shows the fiber-optic cable 108 extending in an L-shape that provides vertical and horizontal sub-arrays. However other multi-dimensional paths can be used to enable triangulation to a unique point. Alternatively, two or more vertical wells can be used to provide additional triangulation information. Yet another way to reduce or eliminate azimuthal ambiguity would be to employ additional sensors capable of providing azimuthal sensitivity, such as accelerometers or geophones.

Figure 9:
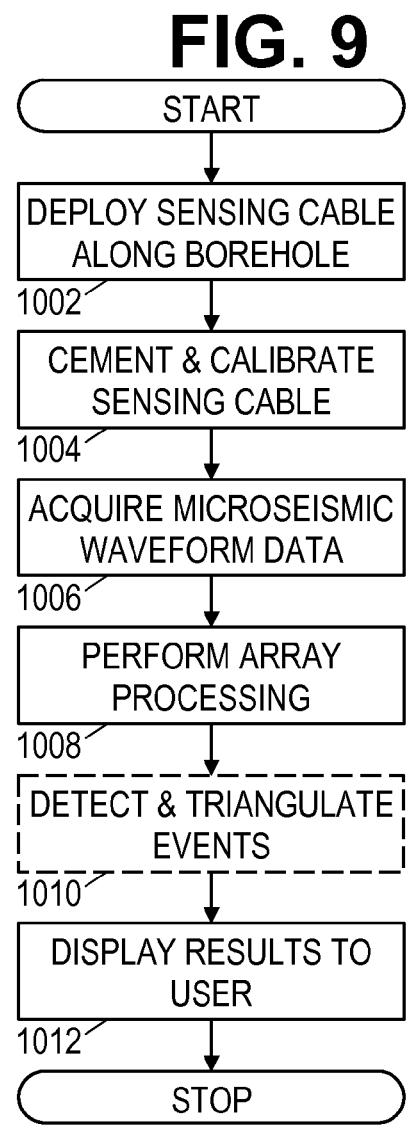
FIG. 9 is a flow diagram of an illustrative seismic monitoring method.

FIG. 9 is a flow diagram of an illustrative seismic monitoring method. Beginning in block 1002, the operators deploy a fiber optic cable along a borehole. As provided in the foregoing description, the sensor cable or sensor array can be mounted to a coupling string, but alternative system embodiments include a "pumpable" sensor cable that is carried into place by the cement slurry itself. Alternatively, or in addition, the fiber optic cable can be embedded in a wireline that is lowered inside the casing, where borehole fluid provides acoustic coupling to the casing and formation. In block 1004, the cable is fixed in place, either by setting of the cement slurry or anchoring of the downhole terminus. If desired, the path of the cable can be ascertained using a calibration technique such as a surface shot or a wireline run with an acoustic source.

In block 1006, the operators acquire microseismic waveform signal data via measurement unit 114. The signal data is communicated to one or more computers for array processing in block 1008, e.g., cross-correlation coefficient calculations, semblance coefficient calculations, spatial and/or frequency transforms, or scanning with a beam forming operation. In block 1010, the computers optionally compare the receive the array-processing results to thresholds to detect and characterize the microseismic events. In block 1012, the computers provide a display of array processing results and/or detected microseismic event information to a user interface.

Note than blocks 1006-1012 can be performed in parallel to provide a user with real-time viewing of microseismic event information. Such usage enables a user to, for example, monitor the progress of a fracturing operation, map out fault structures, track fluid fronts, and garner information about other physical processes occurring around the borehole.

Numerous other variations and modifications will become apparent to those skilled in the art once the above disclosure is fully appreciated. It is intended that the following claims be interpreted to embrace all such variations and modifications.

What is claimed is:

1. A microseismic monitoring system that comprises:
an optical fiber positioned along a curved borehole path to provide azimuthal sensitivity to microseismic events;
a light source that drives the optical fiber;
at least one light sensor that analyzes Rayleigh backscattered light to obtain acoustic signals for each of multiple sensing stations along the borehole, wherein the multiple sensing stations are associated with different sub-arrays including at least one sub-array before a curve along the borehole path and at least one sub-array after the curve; and
a processor that determines an incidence angle for each of the different sub-arrays and that triangulates a microseismic event location based on the determined incidence angles.

2. The system of claim 1, wherein as part of said determining, the processor cross-correlates at least two of said acoustic signals.

3. The system of claim 1, wherein as part of said determining, the processor performs a spatial and frequency domain transform of said acoustic signals.

4. The system of claim 1, wherein as part of said determining, the processor performs a radon transform of said acoustic signals.

5. The system of claim 1, wherein as part of said determining, the processor performs a beam-forming operation on said acoustic signals.

6. The system of claim 1, wherein the optical fiber extends along a three-dimensional borehole path.

7. The system of claim 1, wherein said sensor provides distributed sensing enabling said multiple sensing stations to be spaced no more than one meter apart.

8. The system of claim 1, wherein the borehole includes casing with a cemented annulus and the optical fiber extends along the cemented annulus.

9. The system of claim 1, further comprising a second light sensor coupled to a second optical fiber separated from the first fiber, said second light sensor providing the processor with acoustic signals for each of multiple sensing stations along the second optical fiber.

10. The system of claim 9, wherein the second optical fiber is in a second borehole.

11. A microseismic sensing method that comprises:
transmitting modulated light into an optical fiber positioned along a curved borehole path to provide azimuthal sensitivity to microseismic events;
analyzing Rayleigh backscattered light to obtain acoustic signals for each of multiple sensing stations along the borehole, wherein the multiple sensing stations are associated with different sub-arrays including at least one sub-array before a curve along the borehole path and at least one sub-array after the curve;
determining an incidence angle for each of the different sub-arrays;
triangulating a microseismic event location based on the determined incidence angles; and
representing microseismic event information on a user interface.

12. The method of claim 11, wherein said determining includes cross-correlating at least two of said acoustic signals.

13. The method of claim 11, wherein said determining includes performing a spatial and frequency domain transform of said acoustic signals.

14. The method of claim 11, wherein said determining includes applying a beam-forming operation on said acoustic signals.

15. The method of claim 11, wherein the optical fiber extends along a three-dimensional borehole path.

16. The method of claim 11, wherein said multiple sensing stations are spaced no more than one meter apart.

\* \* \* \* \*